March 15, 1966 K. B. MAGLEBY ETAL 3,241,076

SIGNAL SAMPLING CIRCUIT INCLUDING A SIGNAL CONDUCTOR DISPOSED IN THE ELECTROMAGNETIC FIELD OF A SHORTED TRANSMISSION LINE

Filed March 18, 1963

INVENTORS
KAY B. MAGLEBY
WAYNE M. GROVE
BY Albert C. Smith
AGENT

United States Patent Office 3,241,076
Patented Mar. 15, 1966

3,241,076

SIGNAL SAMPLING CIRCUIT INCLUDING A SIGNAL CONDUCTOR DISPOSED IN THE ELECTROMAGNETIC FIELD OF A SHORTED TRANSMISSION LINE

Kay B. Magleby, San Jose, and Wayne M. Grove, Palo Alto, Calif., assignors to Hewlett-Packard Company, Palo Alto, Calif., a corporation of California Filed Mar. 18, 1963, Ser. No. 265,767
7 Claims. (Cl. 328—151)

This invention relates to oscilloscope apparatus for sampling signals having very fast rise and fall times and having extremely high frequencies.

The principal object of the invention is to provide a sampling circuit having a bandwidth of several kilomegacycles and which is capable of sampling a signal having a rise time of the order of a fraction of a millimicrosecond.

Another object of the invention is to provide an improved signal sampling circuit.

In accordance with a preferred embodiment of the present invention a short section of signal conductor is surrounded by a conductive plane. A pair of diodes are disposed to have one set of end terminals make contact with the signal conductor and to have the other end terminals capacitively connected to the conductive plane. This plane is so shaped as to form, in conjunction with the signal conductor, a pair of shorted transmission lines connected in parallel. A step signal applied to these lines is thus differentiated by the lines to form a sampling pulse which has very short duration and which renders the diodes momentarily conductive. The capacitors connecting the end terminals of the diodes and the conductive plane are charged to a fraction of the input signal during the conduction time of the diodes. The desired output signal from the sampling circuit is derived from the signals appearing on the capacitors after the sampling pulse disappears and the diodes return to the nonconductive state.

Other and incidental objects of the present invention will be apparent from a reading of this specification and an inspection of the accompanying drawing in which.

Figure 1:
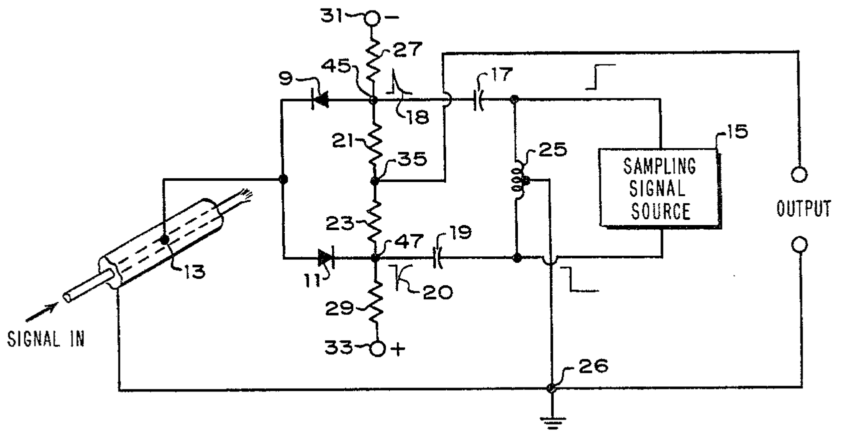
FIGURE 1 shows a simplified schematic diagram of the present invention.

Referring now to FIGURE 1 there is shown a pair of oppositely-poled diodes 9 and 11 having end terminals connected to the line 13. Each of the output terminals of the sampling signal source 15 are connected through a capacitor 17, 19 to the remaining end terminals 45, 47 of the diodes 9 and 11. These end terminals of the diodes are connected together through serially connected resistors 21 and 23. The output of the circuit is obtained with respect to ground from the common terminal 35 of these resistors. An inductor 25 having a center tap connected to ground is connected across the output terminals of sampling signal source 15. Bias signal for maintaining the diodes back biased is supplied through resistors 27 and 29 from the terminals 31 and 33, respectively, of a power supply.

Signals of small amplitude applied to the circuit with respect to ground 26 from line 13 have no effect upon the circuit until the diodes 9 and 11 are rendered conductive. The signal from the sampling signal source 15 is applied with sufficient amplitude and polarity through capacitors 17 and 19 to overcome the back biasing signals applied on the diodes 9 and 11. The signals which forward bias the diodes appear as sample pulses 18 and 20 of equal amplitude but of opposite polarity. These pulses decrease in amplitude as the current builds up in inductor 25. The diodes 9 and 11 are maintained conductive until the decaying pulses at the end terminals 45 and 47 are insufficient to overcome the back-biasing signals applied to the diodes. During this period of conduction, the diodes permit the capacitors 17 and 19 to charge to some portion of the input signal apearing on line 13. When the diodes become nonconductive, the average value of the signals on the capacitors 17 and 19 appears at the common terminal 35 and hence at the output of the circuit. The signal appearing at the output of the circuit thus provides an indication of the amplitude of the signal appearing on line 13 at the sampling instant when the diodes 9 and 11 were rendered momentarily conductive. The duration of the conductive state of the diodes is largely determined by the internal impedance of the sampling signal source 15 and the inductor 25. Since the bandwidth of the circuit is determined by the conduction period of the diodes and hence by the width of the sampling pulse, it is desirable to maintain the period of conduction of the diodes 9 and 11 extremely small. Also since the conduction period is maintained small, it is essential that the charging paths for the capacitors 17 and 19 be low in impedance so that the capacitors may charge substantially to the amplitude of the signal during the conduction period. The sampling efficiency of the circuit (defined as the ratio of the voltage to which the capacitor charges to the amplitude of the signal to be sampled at the sampling instant) is improved as the impedance in the charging circuit is decreased for the capacitors 17 and 19 are permitted to charge more nearly to the amplitude of the applied signal during the sampling instant.

Figure 2:
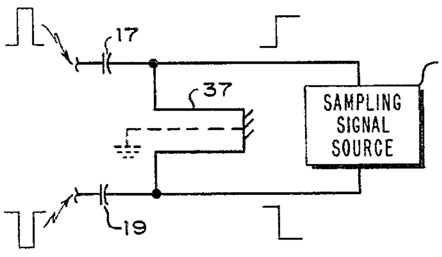
FIGURE 2 shows a portion of the diagram of FIGURE 1 modified using a shorted transmission line.

FIGURE 2 shows a portion of the circuit of FIGURE 1 in which the inductor 25 has been replaced by a transmission line 37 which is shorted to ground at one end. A step of current provided by the sampling signal source 15 when applied to the remaining portion of the circuit through the capacitors 17 and 19 and to the transmission line 37, renders the diodes 9 and 11 of FIGURE 1 conductive and initiates a wave which propagates along the length of transmission line 37. The diodes thus remain conductive during the time required for the wave to propagate down the line, reflect at the shorted end and return to the input end to terminate the signal applied to the diodes. The shorted transmission line 37 thus differentiates the signal provided by the sample signal source 15 and improves the shape of the sample pulses. One disadvantage inherent in this system is that the charging impedance for the capacitors 17 and 19 during the conduction period of the diodes includes the impedance presented by the inductance of the conductors of the transmission line 37 and the characteristic impedance of the line. This combination of impedances minimizes the percentage of the amplitude of the applied signal to which capacitors 17 and 19 may charge and hence decreases the sampling efficiency. The impedances in the charging circuits may be decreased and hence the sampling efficiency improved by splitting the transmission line 37 about a conductive plane which is then grounded at the input end of the transmission line, as shown by the dotted outline of FIGURE 2. The impedance presented by the transmission line in the charging circuit of the capacitors is thus decreased and includes only the characteristic impedance of the transmission line as seen at its input end with respect to the ground reference.

Figure 3:
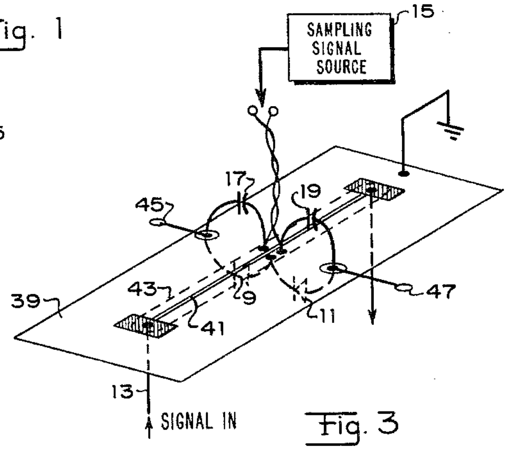
FIGURE 3 is a pictorial diagram of an improved transmission line for the circuit of FIGURE 1.

An improvement of the circuit of FIGURE 2 uses a transmission line as shown in the pictorial diagram of FIGURE 3 wherein the upper conductive laminate 39 of a laminated circuit board forms a conductive plane which is split along line 41. The lower laminate of the board forms conductor 43 which is juxtapositioned about split 41 in the upper conductive laminate 39. This split in the upper laminate forms a transmission line in conjunction with the conductive strip 43 of the lower laminate, which transmission line is driven at the central points by the signal from the sampling signal source 15. Applied signal appearing at the center of conductive strip 43 is applied to the diodes 9 and 11. Thus, a step of current provided by the sampling signal source 15 is differentiated by the transmission lines formed by the upper laminate of the circuit board to form a sampling pulse having a width which is equal to twice the propagation time of the line formed by one half the length of the split. The diodes 9 and 11 are thus rendered conductive during the time it takes for the step of current to propagate down the half length of line and back. The capacitors 17 and 19 thus charge to a portion of the signal appearing on the conductor 43 during the sampling instant. The output indication is derived from the signals on capacitors 17 and 19 which appear on terminals 45 and 47, respectively. The circuit arranged in this configuration thus minimizes the impedance in the charging circuit for the capacitors 17 and 19. In practice, however, the pair of lines formed by the split 41 in the conductive laminate 39 presents an extremely low impedance to the sampling signal source 15. This makes it difficult to produce a sample pulse of sufficient amplitude to render the diodes conductive.

Figure 4:
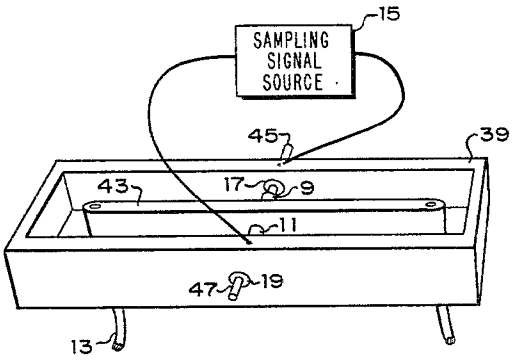
FIGURE 4 is a pictorial diagram of the sampler apparatus of the present invention for use in the circuit of FIGURE 1.

The apparatus shown in the pictorial diagram of FIGURE 4 overcomes the disadvantage of the low driving point impedance of the transmission lines in the apparatus of FIGURE 3. The conductive plane 39 of FIGURE 3 is shown wrapped around the center conductor 43 in the apparatus of FIGURE 4. The impedance presented to the sampling signal source 15 in this configuration is increased by a factor of 8 or 10, thereby developing greater sample pulses for forward biasing the diodes 9 and 11. Also, the capacitive connection between the output terminals of the sampling signal source 15 and the end terminals of diodes 9 and 11 is provided by capacitors 17 and 19 which are formed by the conductors 45 and 47 passing through the ground plane at a central point on the length thereof. The diodes 9 and 11 are placed in contact with the center conductor 43 at a point equidistant from the ends thereof. The apparatus of FIGURE 4 thus operates substantially as described for the circuit of FIGURE 1. When a step of current provided by the sampling signal source 15 is applied to the center point on the length of ground plane 39 it is applied through the capacitors 17 and 19 to the diodes 9 and 11, respectively, and sets up a wave which propagates in opposite directions away from the central point. The diodes thus remain conductive until these waves propagate to the ends, reflect from the shorted ends and recombine at the central point to terminate the sampling pulse. The desired indication of the sampled signal is derived from the combination of signals appearing on capacitors 17 and 19 with respect to ground after the diodes 9 and 11 return to the nonconductive state.

Therefore the apparatus of the present invention provides a simple means for deriving a narrow sample of an applied waveform under examination. The width of the sample pulse is accurately determined by the propagation times of transmission lines and thus extremely wide bandwidth using an accurately controlled sample pulse is achieved.

We claim:

1. Apparatus for sampling an applied signal appearing on a conductor with respect to a reference potential, said apparatus comprising:
- a signal conductor connected to the conductor carrying said applied signal;
- a source of sampling signal;
- circuit means including a diode and a capacitor serially connecting said source to said signal conductor at a point along the length thereof;
- a bias supply connected to said diode for rendering said diode nonconductive;
- the sampling signals applied to said diode from said source having sufficient amplitude and polarity to render said diode conductive;
- a transmission line having a shorted end and having an input end connected to said source and being disposed about and electromagnetically coupled to the signal conductor at said point along the length thereof to form the reference potential conductor for said signal conductor; and
- means connected to said capacitor for deriving an output from the signal appearing thereacross.

2. Apparatus for sampling an applied signal appearing on a conductor with respect to a reference potential, said apparatus comprising:
- a signal conductor connected to the conductor carrying said applied signal;
- a source of sampling signal;
- circuit means including a unidirectional conduction device and an energy storage element serially connecting said source to said signal conductor at a point along the length thereof;
- the sampling signals applied to said unidirectional conduction device from said source having sufficient amplitude and polarity to render said unidirectional conduction device conductive;
- a transmission line having a shorted end and having an input end connected to said source and being disposed about and electromagnetically coupled to the signal conductor at said point along the length thereof to form the reference potential conductor for said signal conductor; and
- means connected to said energy storage element for deriving an output from the signal appearing thereacross.

3. Apparatus for sampling an applied signal appearing on a conductor with respect to a reference potential, said apparatus comprising:
- a signal conductor connected to the conductor carrying said applied signal;
- a pair of serially-connected diodes having end terminals, the common terminal of said diodes being connected to said signal conductor at a point along the length thereof;
- a bias supply connected to the end terminals of said diodes for rendering said diodes nonconductive;
- a source of sampling signal;
- means including a capacitor for each of said end terminals and connecting said sampling source to said diodes;
- a transmission line including a pair of conductors and having a shorted end and having an input end connected to the output of said source;
- the conductors at the input end of said transmission line being disposed equidistant from said signal conductor at said point along the length thereof in electromagnetic coupling relationship to said signal conductor to form the conductor of reference potential for said signal conductor;
- the combination of said sampling signal from said source and the signal appearing on said transmission line producing pulses of sufficient amplitude and polarity and duration to render said diodes conductive for a time equal to twice the one-way propagation time of said line; and
- means connected to said capacitors for producing an output from the signal appearing thereacross.

4. Apparatus for sampling an applied signal appearing on a conductor with respect to a reference potential, said apparatus comprising:
- a signal conducting path connected to the conductor carrying the applied signal;

a transmission line including a pair of conductors having a shorted end and having an input end and being disposed near said signal conducting path for interaction with the electromagnetic fields about the conductors of the transmission line, the shorted transmission line forming the reference potential conductor for the conductor carrying applied signal;

a source of sampling signal connected to the input end of said transmission line for applying the sampling signal to the conductors of said transmission line in phase opposition;

a diode connected to said signal conducting path at a point therealong near the input end of said transmission line;

a capacitor connecting a conductor of said transmission line at the input end thereof to said diode for applying the signal appearing at said input end to the diode with sufficient amplitude to render the diode conductive; and means connected to said capacitor for producing an output signal related to the signal appearing across said capacitor.

5. Apparatus for sampling an applied signal appearing on a conductor with respect to a reference potential, said apparatus comprising:

a transmission line including a pair of conductors having a shorted end and an input end;

a signal conducting path connected to the conductor carrying the applied signal and disposed near the conductors of the transmission line at equal distances from said conductors for said transmission line to form the reference potential conductor of said signal conducting path;

a source of sampling signal connected to the input end of said transmission line for applying the sampling signal to the conductors of said transmission line in phase opposition;

a diode connected to said signal conducting path at a point therealong near the input end of said transmission line;

a capacitor connecting a conductor of said transmission line at the input end thereof to said diode for applying the signal appearing at said input end of the diode with sufficient amplitude to render the diode conductive; and means connected to said capacitor for producing an output signal related to the signal appearing across said capacitor.

6. Apparatus for sampling an applied signal appearing on a conductor with respect to a reference potential, said apparatus comprising:

a pair of transmission lines, each including a pair of conductors having a shorted end and an input end;

means connecting the input ends of said transmission lines in parallel with said shorted ends maximally spaced;

a signal conducting path connected to the conductor carrying the applied signal and disposed near the conductors of the pair of transmission lines at equal distances therefrom for said transmission lines to form the reference potential conductor of said signal conducting path;

a source of sampling signal connected to the input ends of said transmission lines for applying the sampling signal to the conductors of said transmission lines in phase opposition;

a pair of diodes connected to said signal conducting path at a point therealong near the input ends of said transmission lines;

a capacitor for each of the diodes connecting the common connection of corresponding conductors of said transmission lines at the input ends thereof to a diode for applying the signal appearing at said input end to the diode with sufficient amplitude to render the diode conductive; and means connected to said capacitors for producing an output signal related to the signal appearing across said capacitors.

7. Apparatus for sampling an applied signal appearing on a first transmission line which includes a first conductor and a conductor of reference potential, said apparatus comprising:

second and third transmission lines, each including a pair of conductors having a shorted end and an input and;

a signal conducting path connected to said first conductor of the first transmission line for carrying the applied signal, said signal conducting path being disposed near the conductors of the second and third transmission lines at equal distances from the conductors thereof;

means connecting the input ends of said second and third transmission lines in parallel with said shorted ends maximally spaced;

means connecting the conductor of reference potential of the first transmission line to the conductors of the second and third transmission lines, said last named transmission lines forming the reference potential conductor of said signal conducting path;

a source of sampling signal connected to the input ends of said transmission lines for applying the sampling signal to the conductors of said transmission lines in phase opposition;

a pair of diodes connected to said signal conducting path at a point therealong which is intermediate the spacing of the shorted ends of said transmission lines;

a bias supply connected to said diodes for rendering said diodes nonconductive;

a capacitor for each of the diodes connecting the common connections of corresponding conductors of said second and third transmission lines at the input ends thereof to the diodes for applying the signal appearing at said input ends to the diodes with sufficient amplitude to render the diodes momentarily and simultaneously conductive; and means connected to said capacitors for producing an output signal related to the signal appearing across said capacitors.

References Cited by the Examiner

UNITED STATES PATENTS

| | | | |
|---|---|---|---|
| 2,761,130 | 8/1956 | Kibler | 307—88.5 |
| 2,807,015 | 9/1957 | Shank | 328—55 |
| 2,929,928 | 3/1960 | Hodder | 328—150 |
| 2,975,299 | 3/1961 | Mintzer | 328—56 |
| 3,090,005 | 5/1963 | McConnell | 307—88.5 |
| 3,153,732 | 10/1964 | Mortley et al. | 328—151 |

FOREIGN PATENTS

| | | |
|---|---|---|
| 1,005,575 | 4/1957 | Germany. |
| 1,041,112 | 10/1958 | Germany. |
| 126,912 | 5/1959 | U.S.S.R. |

JOHN W. HUCKERT, *Primary Examiner*,

J. D. CRAIG, *Assistant Examiner*.